(12) United States Patent
Imai et al.

(10) Patent No.: US 11,808,337 B2
(45) Date of Patent: Nov. 7, 2023

(54) METHOD FOR MANUFACTURING STRAIN WAVE GEAR DEVICE AND STRAIN WAVE GEAR DEVICE

(71) Applicant: Nabtesco Corporation, Tokyo (JP)

(72) Inventors: Masashi Imai, Tokyo (JP); Yuichi Asakawa, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 9 days.

(21) Appl. No.: 17/683,472

(22) Filed: Mar. 1, 2022

(65) Prior Publication Data
US 2022/0282777 A1 Sep. 8, 2022

(30) Foreign Application Priority Data

Mar. 5, 2021 (JP) ................................. 2021-035652

(51) Int. Cl.
*F16H 49/00* (2006.01)
*F16H 53/02* (2006.01)

(52) U.S. Cl.
CPC ......... *F16H 49/001* (2013.01); *F16H 53/025* (2013.01); *F16H 2049/003* (2013.01)

(58) Field of Classification Search
CPC . F16H 49/001; F16H 2049/003; F16H 53/025
See application file for complete search history.

(56) References Cited

U.S. PATENT DOCUMENTS

| | | | | |
|---|---|---|---|---|
| 1,922,756 A | * | 8/1933 | Candee | B23F 15/02 409/48 |
| 3,171,212 A | * | 3/1965 | Michalec | G01B 5/20 33/501.13 |
| 11,002,353 B2 | * | 5/2021 | Tan | F16H 49/001 |
| 11,060,597 B2 | * | 7/2021 | Imagawa | B25J 9/102 |

FOREIGN PATENT DOCUMENTS

| | | | |
|---|---|---|---|
| JP | 11-351341 A | | 12/1999 |
| JP | 2003004437 A | * | 1/2003 |
| JP | 2019183880 A | * | 10/2019 |
| JP | 2020-041600 A | | 3/2020 |

OTHER PUBLICATIONS

Office Action dated Nov. 16, 2022, issued in corresponding German Patent Application No. 10 2022 104 914.0 with English translation (15 pgs).

* cited by examiner

*Primary Examiner* — Terence Boes

(74) *Attorney, Agent, or Firm* — Pillsbury Winthrop Shaw Pittman, LLP

(57) ABSTRACT

One aspect of the present invention provides a method for manufacturing a strain wave gear device. The method includes steps of measuring a between pin diameter of an internal gear, measuring an over pin diameter of an external gear, where the external gear is to be placed radially inside the internal gear, configured to mesh with the internal gear, and flexible, measuring a dimension of a bearing, where the bearing is to be placed radially inside the external gear, and flexible, and machining an elliptical cam, where the ellipti- (Continued)

cal cam is to be placed radially inside the bearing, and configured to flex the external gear in a non-circular manner. The elliptical cam is machined based on the measured dimensions of the internal gear, external gear and bearing such that the internal and external gears mesh with each other at a constant position.

19 Claims, 3 Drawing Sheets

METHOD FOR MANUFACTURING STRAIN WAVE GEAR DEVICE AND STRAIN WAVE GEAR DEVICE

CROSS-REFERENCE TO RELATED APPLICATIONS

The present application is based on and claims the benefit of priority from Japanese Patent Application Serial No. 2021-035652 (filed on Mar. 5, 2021), the contents of which are hereby incorporated by reference in their entirety.

TECHNICAL FIELD

The present disclosure relates to a method for manufacturing a strain wave gear device and a strain wave gear device.

BACKGROUND

Industrial robots, machine tools and the like may include a speed reducer to reduce the speed of rotation of a drive source such as a motor (see, for example, Japanese Patent Application Publication No. 2020-41600 ("the '600 Publication")).

The '600 Publication discloses a speed reducer device, which is a strain wave gear device including a wave generator (WG), a circular spline (CS), and a flex spline (FS). Gears are extremely small modules. If their machining-induced errors add up, the gears mesh with each other at an offset position, and the offset increases as the module increases. To deal with this issue, when assembled, gears generally need to be adjusted such that they can mesh with each other at an appropriate position. The strain wave gear device disclosed in the '600 Publication also employ such adjustment. More specifically, the wave generator is incorporated into the strain wave gear device as an example solution to adjust the position of the meshing between the circular spline (internal gear) and the flex spline (external gear). The over pin diameter along the major axis of the elliptically deformed external gear is measured. The external gear is machined according to the target (with profile shifting) and cut, so that the external gear can mesh with the internal gear at a theoretical position.

If the conventional technique is employed to adjust the position of the meshing between the internal and external gears, each individual internal gear is differently profile shifted. In the conventional art, in other words, each internal gear meshes with the external gear differently. As a result, the speed reducer performance may vary, and the tooth flanks may suffer from compromised durability.

SUMMARY

The present disclosure provides a method for manufacturing a strain wave gear device and a strain wave gear device that are capable of preventing variability in speed reducer performance caused by profile shifting performed to achieve meshing at an appropriate position and also of providing more durable tooth flanks.

(1) One aspect of the present disclosure provides a method for manufacturing a strain wave gear device. The method includes steps of measuring a dimension of an internal gear, measuring a dimension of an external gear, where the external gear is to be placed inside the internal gear in a radial direction, the external gear is configured to mesh with the internal gear, and the external gear is flexible, measuring a dimension of a bearing, where the bearing is to be placed inside the external gear in the radial direction, and the bearing is flexible, and machining an elliptical cam, where the elliptical cam is to be placed inside the bearing in the radial direction, and the elliptical cam is configured to flex the external gear in a non-circular manner. The elliptical cam is machined based on the measured dimensions of the internal gear, external gear and bearing such that the internal and external gears mesh with each other at a constant position.

The internal gear, external gear and bearing are first made, and their dimensions are measured. The measured dimensions are used to determine a target value of the elliptical shape of the elliptical cam. In this manner, the elliptical cam can have a theoretical elliptical shape satisfying the target value. Stated differently, the above-described method does not employ the conventional technique of machining gears according to a target tooth profile but can machine, for each strain wave gear device, an elliptical cam into an ellipse having a differently shaped major axis. The elliptical cam, which is machined according to the target value and thus has a differently shaped major axis, is assembled with the external gear. As a result, the amount of elastic deformation can be changed. This makes it possible to adjust the over pin diameter of the external gear along the major axis while the theoretical tooth profile remains unchanged. This can reduce variability in speed reducer performance caused by variability in tooth profile of the internal gear attributable to profile shifting. Accordingly, the tooth flanks can achieve improved durability.

(2) In the step of machining the elliptical cam, one of a plurality of ellipse cutting programs may be selected and used.

(3) A between pin diameter of the internal gear may be measured.

(4) An over pin diameter of the external gear may be measured.

(5) In the step of machining the elliptical cam, a major axis dimension of the elliptical cam may be determined based on the measured dimensions, and a machining dimension of the elliptical cam may be determined such that a length of a circumference of the elliptical cam remains unchanged.

(6) Another aspect of the present disclosure provides a method for manufacturing a strain wave gear device. The method includes steps of measuring a dimension of an internal gear, measuring a dimension of an external gear, where the external gear is to be placed inside the internal gear in a radial direction, the external gear is configured to mesh with the internal gear, and the external gear is flexible, measuring a dimension of a bearing, where the bearing is to be placed inside the external gear in the radial direction, and the bearing is flexible, and machining an elliptical cam, where the elliptical cam is to be placed inside the bearing in the radial direction, and the elliptical cam is configured to flex the external gear in a non-circular manner. The elliptical cam is machined based on the measured dimensions of the internal gear, external gear and bearing such that the internal and external gears mesh with each other at a constant position. In the step of machining the elliptical cam, one of a plurality of ellipse cutting programs is selected and used A between pin diameter of the internal gear is measured. An over pin diameter of the external gear is measured. In the step of machining the elliptical cam, a major axis dimension of the elliptical cam is determined based on the measured dimensions, and a machining dimension of the elliptical cam is determined such that a length of a circumference of the elliptical cam remains unchanged.

The internal gear, external gear and bearing are first made, and their dimensions are measured. The measured dimensions are used to determine a target value of the elliptical shape of the elliptical cam. In this manner, the elliptical cam can have a theoretical elliptical shape satisfying the target value. Stated differently, the above-described method does not employ the conventional technique of machining gears according to a target tooth profile but can machine, for each strain wave gear device, an elliptical cam into an ellipse having a differently shaped major axis. The elliptical cam, which is machined according to the target value and thus has a differently shaped major axis, is assembled with the external gear. As a result, the amount of elastic deformation of the external gear can be changed. This makes it possible to adjust the over pin diameter of the external gear along the major axis while the theoretical tooth profile remains unchanged. This can reduce variability in speed reducer performance caused by variability in tooth profile of the internal gear attributable to profile shifting. Accordingly, the tooth flanks can achieve improved durability. Furthermore, an optimal ellipse cutting program can be selected for the target value of the elliptical shape determined based on the measured dimensions of the internal gear, external gear and bearing. With the use of the selected ellipse cutting program, the elliptical cam can be accurately machined within a small offset from the target value. The between pin diameter of the internal gear is measured. This means that the dimension of the internal gear can be accurately and easily measured. The over pin diameter of the external gear is measured. This means that the dimension of the external gear can be accurately and easily measured. Furthermore, in the step of machining the elliptical cam, the major axis dimension of the elliptical cam is determined based on the measured dimensions, and the machining dimension of the elliptical cam is determined such that the length of the circumference of the elliptical cam remains unchanged. In this manner, the measured dimensions of the internal gear, external gear and bearing are used to determine the length of the major axis of the elliptical shape, thereby setting the target value for the elliptical shape.

(7) One aspect of the present disclosure provides a strain wave gear device including an internal gear, an external gear placed inside the internal gear in a radial direction, where the external gear meshes with the internal gear, and the external gear is flexible, a bearing placed inside the external gear in the radial direction, where the bearing is flexible, and an elliptical cam placed inside the bearing in the radial direction, where the elliptical cam is configured to flex the external gear in a non-circular manner. The elliptical cam is machined based on measured dimensions of the internal gear, external gear and bearing such that the internal and external gears mesh with each other at a constant position.

With such arrangement, the elliptical cam is machined based on the measured dimensions of the internal gear, external gear and bearing such that the internal and external gears mesh with each other at a constant position. Thus, the elliptical cam can have a theoretical elliptical shape. This can reduce variability in speed reducer performance caused by variability in tooth profile of the internal gear attributable to profile shifting. Accordingly, the tooth flanks can achieve improved durability.

(8) A between pin diameter of the internal gear may be measured. An over pin diameter of the external gear may be measured. The elliptical cam may be machined using a selected one of a plurality of ellipse cutting programs according to (i) a major axis dimension of the elliptical cam determined based on the measured dimensions and (ii) a machining dimension of the elliptical cam determined such that a length of a circumference of the elliptical cam remains unchanged.

The method for manufacturing a strain wave gear device and the strain wave gear device relating to aspects of the present disclosure can reduce variability in speed reducer performance caused by profile shifting performed to achieve meshing at an appropriate position. Accordingly, the tooth flanks can achieve improved durability.

DESCRIPTION OF THE PREFERRED EMBODIMENTS

The following describes embodiments of the present disclosure with reference to the drawings. In the following description of embodiments and modification examples, like elements will be denoted by the same reference signs and not be redundantly described.

Figure 1:
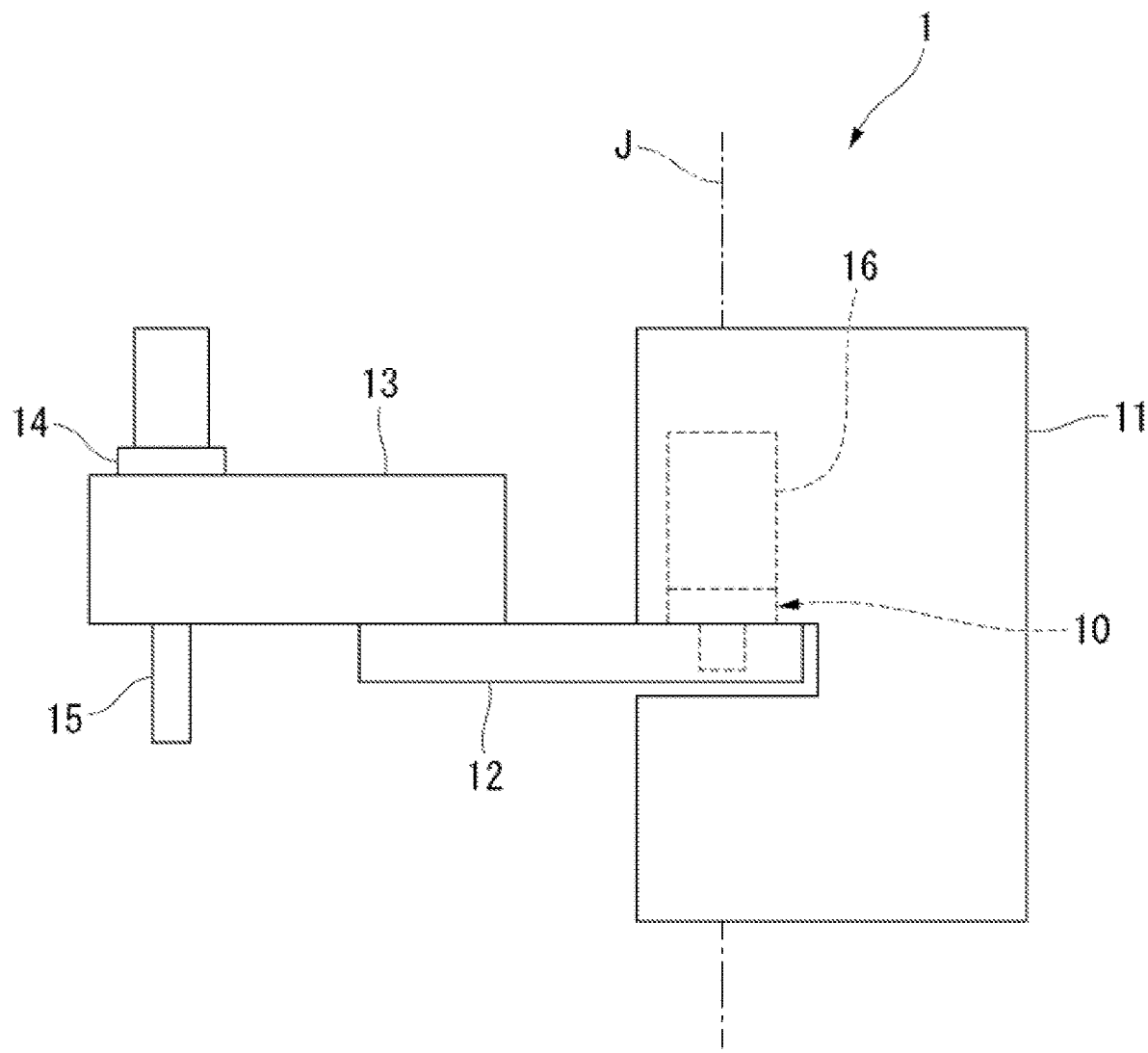
FIG. 1 is a side view showing an industrial robot including a strain wave gear device relating to an embodiment.

FIG. 1 is a side view showing an industrial robot (hereinafter, simply referred to as the robot 1) employing a strain wave gear device 10 having, as a driving unit, a motor with a speed reducer. The robot 1 relating to the present embodiment is an industrial robot used, for example, for supplying, shipping, transporting, and assembling parts of precision equipment and the like. The robot 1 has a base 11, a first arm 12, a second arm 1 3, a work head 14, and an end-effector 15.

The first arm 12, which is rotatable around an axis J, is coupled with the base 11. The second arm 13, which is rotatable around an axis parallel to the axis J, is coupled with the first arm 12. The work head 14 is provided at the front end of the second arm 13 and coupled with the end-effector 15. The base 11 has therein a motor 16 such as a servomotor, and the strain wave gear device 10. The strain wave gear device 10 serves as a speed reducer for reducing the rotations of the motor 16. The first arm 12 is rotatable when acted upon by a driving force from the motor 16. The input shaft of the strain wave gear device 10 is coupled with the rotatable shaft of the motor 16. The output shaft of the strain wave gear device 10 is coupled with the first arm 12. When the driving force from the motor 16 is transmitted to the first arm 12 through the strain wave gear device 10, the first arm 12 rotates within a horizontal plane around the axis J.

Figure 2:
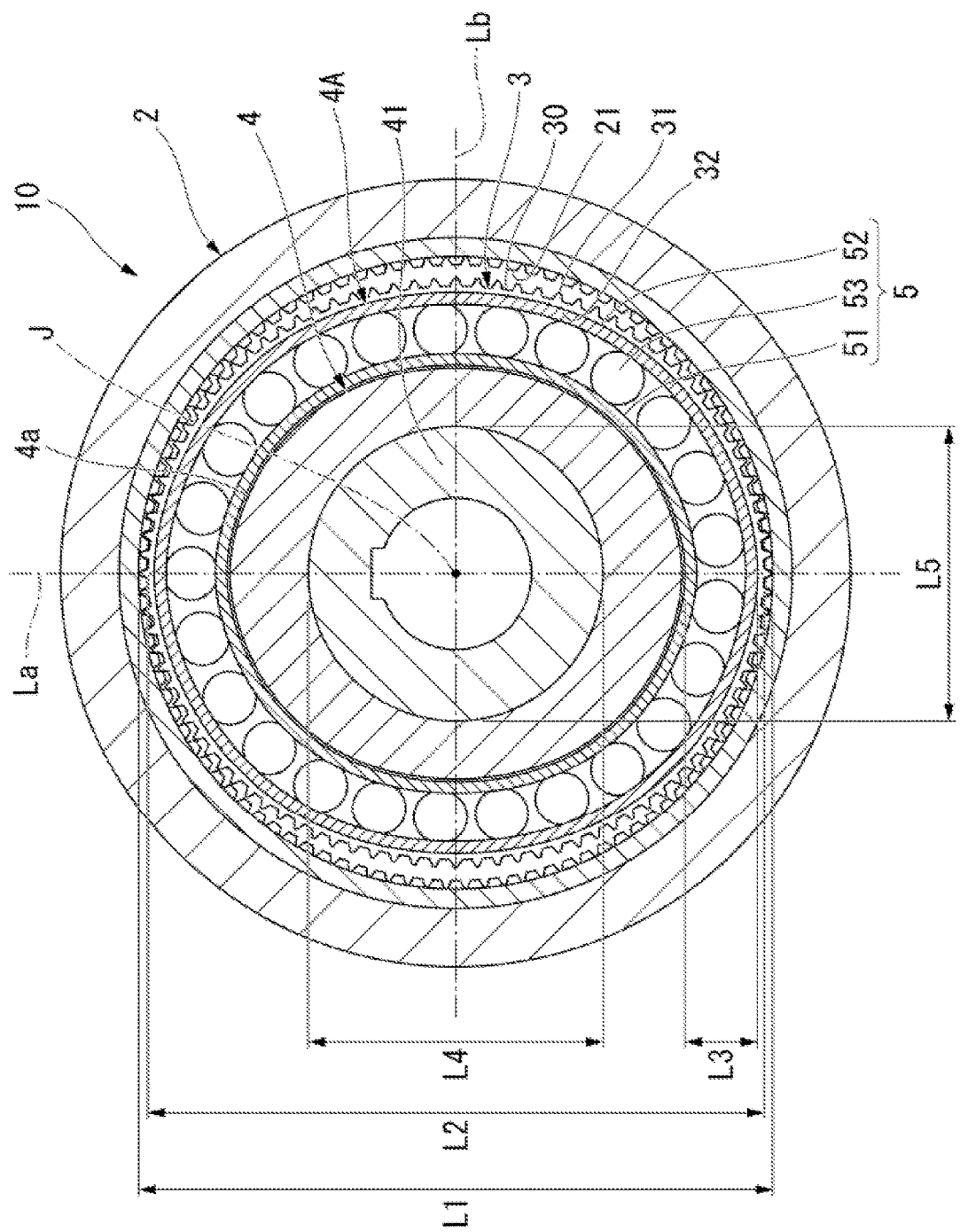
FIG. 2 is a sectional view showing the strain wave gear device relating to the embodiment.

FIG. 2 is a sectional view of the strain wave gear device 10 (a view obtained by cutting the strain wave gear device 10 along the plane including the axis J and orthogonal to the axis J. The shape and dimensions of the strain wave gear device 10 shown in FIG. 2 are examples and do not correspond to actual ones.

The strain wave gear device 10 serves as, for example, a speed reducer. The strain wave gear device 10 includes an internal gear 2, a cup-shaped external gear 3 placed inside the internal gear 2, and a wave generator 4A placed inside the external gear 3. In the strain wave gear device 10, a lubricant such as grease is present in appropriate areas. The wave generator 4A is made up by an elliptical cam 4 and a bearing 5 fitted onto the outer circumferential surface of the elliptical cam 4.

In the present embodiment, the internal gear 2 is connected to the base 11 of the robot 1, as shown in FIG. 1. The external gear 3 is connected to the first arm 12. The elliptical cam 4 is fitted onto the rotatable shaft of the motor, which is not shown, and connected to it with screws or the like.

As shown in FIG. 2, when the rotatable shaft of the motor rotates, the elliptical cam 4 of the strain wave gear device 10 rotates at the same rotational speed as the rotatable shaft of the motor. Here, the internal and external gears 2 and 3 have different numbers of teeth. The difference in the number of teeth causes the internal and external gears 2 and 3 to rotate relative to each other around the axis J (axis of rotation), while their meshing moves in the circumferential direction. In the present embodiment, the internal gear 2 has a larger number of teeth than the external gear 3. This can cause the external gear 3 to rotate relative to the internal gear 2 at a lower rotational speed than the rotational speed of the rotatable shaft of the motor. With the above arrangement, the elliptical cam 4 and the external gear 3 serve respectively as the input and output shafts, so that the strain wave gear device 10 can serve as a speed reducer.

The internal gear 2, external gear 3 and elliptical cam 4 may be connected in any other manners than the one described in the present embodiment. As an alternative example, the external gear 3 may be fixedly attached to the base 11 of the robot 1, and the internal gear 2 may be connected to the first arm 12. In this case, the strain wave gear device 10 can also serve as a speed reducer. Furthermore, the strain wave gear device 10 can also serve as a speed reducer even when the external gear 3 is connected to the rotatable shaft of the motor.

The internal gear 2 is a ring-shaped gear having internal teeth 21 and made of a rigid body.

The external gear 3 is inserted into the internal gear 2. The external gear 3 has external teeth 31 meshing with the internal teeth of the internal gear 2. The external gear 3 is a flexible gear that is flexible and deformable in the radial direction. In other words, the external gear 3 is flexible. The external gear 3 has a smaller number of teeth than the internal gear 2. Such a difference in the number of teeth between the external and internal gears 3 and 2 can constitute a speed reducer.

The external gear 3 relating to the present embodiment is shaped like a cup. The external gear 3 has external teeth 31 formed on the outer circumferential surface thereof. The external gear 3 has, for example, a cylindrical trunk 30 and a bottom. The trunk 30 is open at one end (one end in the direction orthogonal to the plane of the paper in FIG. 2). The bottom extends from the other end of the trunk 30 inward in the radial direction. The trunk 30 is aligned with the axis J and has external teeth 31 meshing with the internal gear 2. The bottom has, for example, an output shaft member attached thereto with screws or the like.

The wave generator 4A is placed inside the external gear 3 and is rotatable around the axis J. The wave generator 4A is configured to deform the trunk 30 of the external gear 3 so that the external teeth 31 can mesh with the internal teeth 21 of the internal gear 2. The trunk 30 is deformable such that its horizontal section is changed into an ellipse or oval defined by a major axis La and a minor axis Lb. The external and internal gears 3 and 2 mesh with each other while being rotatable around the same axis J.

The bearing 5 is attached onto the outer circumference of the elliptical cam 4. The elliptical cam 4 has a shaft 41 rotatable around the axis J. The outer circumferential surface of the elliptical cam 4 is shaped like an ellipse or oval when seen in the direction along the axis J, and the major axis La of the ellipse represents the vertical direction.

The bearing 5 includes flexible inner and outer races 51 and 52, and also includes a plurality of balls 53 placed between the inner and outer races 51 and 52. The inner race 51 is fitted onto the outer circumferential surface 4a of the elliptical cam 4. The inner race 51 is therefore elastically deformed into an ellipse or oval, along the outer circumferential surface 4a of the elliptical cam 4. The outer race 52 is elastically deformed into an ellipse or oval, following the shape of the inner race 51. In other words, the bearing 5 is flexible. The term "flexible" means flexible and deformable. The outer circumferential surface of the outer race 52 is in contact with the inner circumferential surface of the trunk 30. The outer circumferential surface of the inner race 51 and the inner circumferential surface of the outer race 52 respectively form raceways for the balls 53. The raceways guide the balls 53 in the circumferential direction centered on the axis J while allowing the balls 53 to roll. The balls 53 are held in retainers, not shown, so that they are at constant intervals in the circumferential direction. The present embodiment, however, is not limited to such, and the bearing 5 may be embodied without retainers.

The wave generator 4A changes its orientation (the direction of the major axis La changes) as the elliptical cam 4 rotates around the axis J. The outer race 52 is deformable as the orientation of the elliptical cam 4 changes. This allows the meshing between the inner and external gears 2 and 3 to move in the circumferential direction. On the other hand, the inner race 51 is fixedly attached to the outer circumferential surface 4a of the elliptical cam 4 and thus remains deformed in the same manner. The length of the circumference of the inner and outer races 51 and 52 remains unchanged irrespective of whether the elliptical cam 4 rotates.

The strain wave gear device 10 relating to the present embodiment is manufactured according to the following method. The elliptical cam 4 is made based on the dimensions of the internal gear 2, external gear 3, and bearing 5, which are measured according to the manufacturing method. In the present embodiment, the machining performed to make the elliptical cam 4 is adjusted such that the meshing between the internal and external gears 2 and 3 takes place at a position within approximately ±5 μm from a reference value (designed value). Since the strain wave gear device 10 is manufactured according to the following method, the parts including the internal gear 2, external gear 3 and wave generator 4A can be machined with an accuracy of even a few micrometers. This enables the meshing to take place at a position within the above-described range.

<Method for Manufacturing Strain Wave Gear Device>

Figure 3:
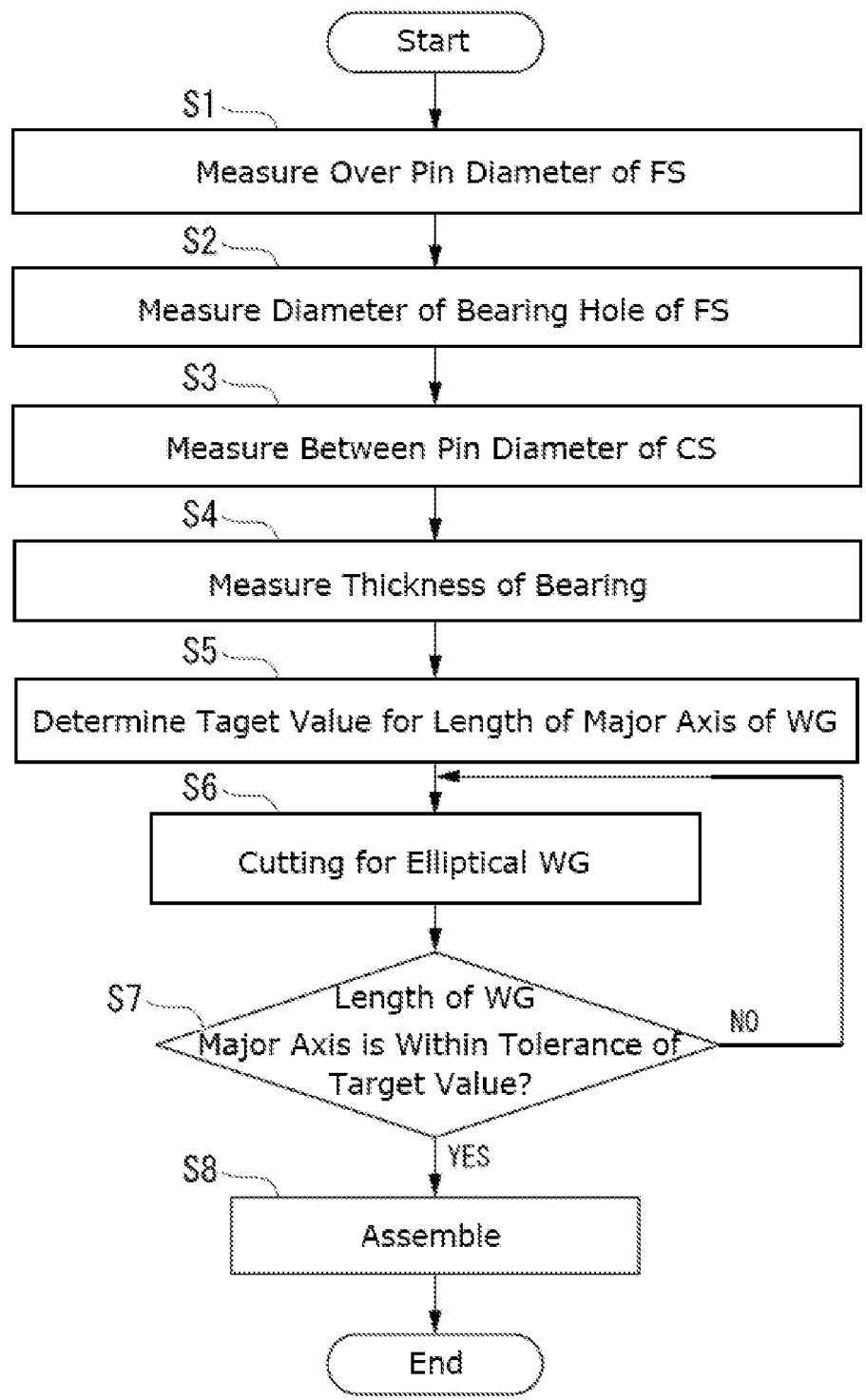
FIG. 3 is a flow chart showing a method for manufacturing the strain wave gear device relating to the embodiment.

Next, the method for manufacturing the strain wave gear device 10 having the above-described configuration is described in detail with reference to the flowchart showing the method for manufacturing the strain wave gear device 10 in FIG. 3 and the sectional view of the strain wave gear device 10 in FIG. 2.

The method for manufacturing the strain wave gear device 10 mainly includes steps of measuring the dimensions of the internal gear 2 (CS), measuring the dimensions of the external gear 3 (FS), measuring the dimensions of the bearing 5, and machining the elliptical cam 4 of the wage generator based on the measured dimensions of the internal gear 2, external gear 3 and bearing 5.

The manufacturing method starts from a preparatory step of manufacturing the internal gear 2, external gear 3 and bearing 5. After this preparatory step, the measuring steps S1 to S4 shown in FIG. 3 are performed. The step of manufacturing these three parts is managed while efforts are made to avoid variability in dimension as much as possible. In a first step S1, the dimensions of the external gear 3 (FS) are measured. In the first step S1, the over pin diameter of the external gear 3 is measured, for example. The over pin diameter is the outer dimension between adjacent pins when balls or pins are placed in the grooves between the external teeth 31. Measuring the over pin diameter can result in obtaining the outer diameter L2 of the external gear 3. The over pin diameter is not the only dimension of the external gear 3 that can be measured, and other dimensions may be measured. For example, a non-contact gear profile measuring device can be used to measure the dimensions. In a second step S2, the diameter (inner diameter) of a bearing hole 32 of the external gear 3 (FS) is measured.

In a third step S3, the dimensions of the internal gear 2 (CS) are measured. In the third step S3, the between pin diameter of the internal gear 2 is measured, for example. The between pin diameter is the inner dimension between adjacent pins when ball or pins are placed in the grooves between the internal teeth 21. Measuring the between pin diameter can result in obtaining the inner diameter L1 of the internal gear 2. The between pin diameter is not the only dimension of the internal gear 2 that is measured, and other dimensions may be measured. For example, a non-contact gear profile measuring device can be used to measure the dimensions.

In a fourth step S4, the thickness of the bearing 5 is measured. The thickness L3 of the bearing 5 to be measured is equivalent to the distance between the inner circumferential surface of the inner race 51 and the outer circumferential surface of the outer race 52. The thickness L3 of the bearing 5 can be measured using, for example, a micrometer.

For the inner diameter L1 of the internal gear 2 and the outer diameter L2 of the external gear 3, the tolerance (the range between the maximum and minimum allowable offsets from the reference value) is ±10 μm, for example. For the thickness L3 of the bearing 5, on the other hand, the tolerance is ±15 μm, for example. Since the variability in dimensions of the internal gear 2, external gear 3, and bearing 5 is absorbed by adjusting the dimensions of the elliptical cam 4 (described below), the meshing between the internal and external gears 2 and 3 can be controlled to take place at a position within, for example, approximately ±5 μm from the reference value (designed value). The internal and external gears 2 and 3 are each formed as a single piece. This means that the internal and external gears 2 and 3 are made with little variability in dimension more easily than is the bearing 5. The reference values for the dimensions of the parts are determined such that the meshing between the internal and external gears 2 and 3 takes place at a reference position.

These three parts can be made in any manner using a variety of machining and shaping techniques. The external gear 3, internal gear 2, and bearing 5 are preferably made of, for example, metal materials. In particular, iron-based materials are preferably used due to their excellent mechanical characteristics, workability and relatively reasonable cost. The iron-based materials include, for example, cast iron, nickel-chromium-molybdenum steel, chromium-molybdenum steel (SCM), maraging steel, and precipitation-hardened stainless steel, but not limited thereto.

The first and second steps S1 and S2 of measuring the dimensions of the external gear 3, the third step S3 of measuring the dimensions of the internal gear 2 and the fourth step S4 of measuring the dimensions of the bearing 5 are not necessarily performed in the above-described order, but can be reordered as appropriate. For example, the steps S1, S2, S3 and S4 can be performed in parallel.

In the next fifth step S5, the elliptical cam 4 is machined based on the measured dimensions of the internal gear 2, external gear 3, and bearing 5. Specifically, in the fifth step S5 of machining the elliptical cam 4, the target value of the major axis dimension L4 of the elliptical cam 4 is determined based on the measured results, and the machining dimensions of the elliptical cam 4 are determined such that the length of the circumference of the elliptical cam 4 remains unchanged. The minor axis dimension L5 of the elliptical cam 4 is determined by the major axis dimension L4 and the length of the circumference. As the elliptical cam 4 is machined according to the thus determined values, the length of the circumference, on which the bearing 5 is press-fit, remains unchanged while the major axis dimension L4 is changed. This can change the amount of elastic deformation of the external gear 3 after the external gear 3 is assembled. This makes it possible to adjust the position of the meshing between the inner and external gears 3 and 2. Accordingly, the fifth step S5 eliminates the need of the conventional method of adjusting the position of the meshing between the internal and external gears 2 and 3. In other words, the wave generator is incorporated, the over pin diameter of the elliptically deformed external gear is measured along the major axis, and the external gear is machined according to the target value such that the internal gear meshes with the external gear at a theoretical position. As a result, the present embodiment eliminates the need of adjusting the meshing position through tooth cuffing.

In the next sixth step S6, an optimum elliptical cam 4 satisfying the machining dimensions of the elliptical cam 4 determined in the fifth step S5 is made by cutting. Since the elliptical cam 4 is machined into an elliptical shape such that a theoretical meshing position is accomplished, the elliptical cam 4 is preferably machined under the same conditions as the internal and external gears 2 and 3.

The elliptical cam 4 is preferably made of, for example, metal materials. In particular, iron-based materials are preferably used due to their excellent mechanical characteristics, workability and relatively reasonable cost. The iron-based materials include, for example, cast iron, nickel-chromium-molybdenum steel, chromium-molybdenum steel (SCM), maraging steel, and precipitation-hardened stainless steel, but are not limited thereto.

In the next seventh step S7, the length of the major axis of the elliptical cam 4 machined in the sixth step S6 (the major axis dimension L4) is measured and the measured major axis dimension L4 is compared against the target value determined in the fifth step S5. If the measured major axis dimension L4 is within the allowable tolerance of the target value (S7: YES), the strain wave gear device 10 is assembled in the eighth step S8. If the measured major axis dimension L4 is outside the allowable tolerance of the target value (S7: NO), the control goes back to the sixth step S6. Subsequently, an optimum elliptical cam 4 satisfying the machining dimensions of the elliptical cam 4 determined in the fifth step S5 is again made by cutting. As a result, the elliptical cam 4 can be highly accurately manufactured. The dimensions of the elliptical cam 4 can be within, for example, ±2 μm of the target value determined by the dimensions of the internal gear 2, external gear 3 and bearing 5 measured in the steps S1 to S4 before the elliptical cam 4 is machined.

In the eighth step S8 of assembling, the elliptical cam 4, which is machined in the sixth and seventh steps S6 and S7, the bearings 5, the external gear 3, and the internal gear 2 are assembled together such that they are arranged in this order in the direction facing away from the central axis (the axis J) of the elliptical cam 4. The stain wave gear device 10 shown in FIG. 2 is assembled.

As described above, the method for manufacturing the strain wave gear device 10 relating to the present embodiment includes steps of measuring the dimensions of the internal gear 2, measuring the dimensions of the external gear 3, measuring the dimensions of the bearing 5, and machining the elliptical cam 4 based on the measured dimensions of the internal gear 2, external gear 3 and bearing 5. In this manner, the internal gear 2, external gear 3 and bearing 5 are first made, and their dimensions are measured. The measured dimensions are used to determine a target value of the elliptical shape of the elliptical cam 4. The resulting elliptical cam 4 can thus have a theoretical elliptical shape satisfying the target value. Stated differently, the present embodiment does not employ the conventional technique of machining gears according to target tooth profile but can machine, for each strain wave gear device 10, the elliptical cam 4 into an ellipse having a differently shaped major axis. The elliptical cam 4, which is machined according to the target value and thus has a differently shaped major axis, is assembled with the external gear 3. As a result, the elliptical cam 4 achieves a different amount of elastic deformation. In the above-described manner, the over pin diameter of the external gear 3 along the major axis can be adjusted while the theoretical tooth profile remains unchanged. This can reduce the variability in speed reducer performance caused by the variability in tooth profile of the internal gear 2 due to profile shifting. Accordingly, the tooth flanks can achieve improved durability.

According to the method of manufacturing the strain wave gear device 10 relating to the present embodiment, the between pin diameter of the internal gear 2 is measured. This means that the dimensions of the internal gear 2 can be accurately and easily measured.

According to the method of manufacturing the strain wave gear device 10 relating to the present embodiment, the over pin diameter of the external gear 3 is measured. This means that the dimensions of the external gear 3 can be accurately and easily measured.

Furthermore, in the present embodiment, in the step of machining the elliptical cam 4, the major axis dimension L4 of the elliptical cam 4 is determined based on the measure dimensions, and the machining dimensions of the elliptical cam 4 are determined such that the length of the circumference of the elliptical cam 4 remains unchanged. In this manner, the measured dimensions of the internal gear 2, external gear 3 and bearing 5 are used to determine the length of the major axis of the elliptical shape, thereby designing the target value of the elliptical shape.

The present invention is not limited to the above-described embodiments and can be modified in a variety of designs without deviating from the spirit of the present invention. For example, the shape of the elliptical cam 4 is not limited to the one employed in the above-described embodiment (FIG. 2). For example, the elliptical cam 4 can be shaped like a standard ellipse as in the above-described embodiment, or like a special ellipse.

The strain wave gear device 10 relating to the present embodiment uses, as an example, a cup-shaped external gear 3, but the present invention is not limited to such. For example, the external gear 3 can be shaped like a hat, specifically, a silk hat. The present embodiment can be also applied to any strain wave gear devices including external gears having other shapes.

According to the above description, the strain wave gear device 10 relating to the present embodiment is applied to an industrial robot, but the present invention is not limited to such. For example, the strain wave gear device relating to the present invention can be applied to, for example, machine tools and automobiles.

For example, in the step of machining the elliptical cam 4, more than one ellipse cutting program may be presented and one of them may be selected and used, Specifically, the above-described method for manufacturing the strain wave gear device 10 can additionally include, between the fifth and sixth steps S5 and S6, a step of selecting one of a plurality of ellipse cutting programs usable in the step of machining the elliptical cam 4 (hereinafter, referred to as the tenth step S10). To do so, the ellipse cutting programs are configured in a machine in advance. In the tenth step S10, an optimal ellipse cutting program for the machining dimensions of the elliptical cam 4 determined in the fifth step S5 is selected. In the sixth step S6, the ellipse cutting program selected in the tenth step S10 can be used to machine the elliptical cam 4 by cutting. In this manner, an optimal ellipse cutting program can be selected for the target value of the elliptical shape determined based on the measured dimensions of the internal gear 2, external gear 3 and bearing 5. With the use of the selected ellipse cutting program, the elliptical cam 4 can be accurately made within a small tolerance from the target value.

Furthermore, according to the manufacturing method relating to the present embodiment, in the step of machining the elliptical cam 4, the major axis dimension L4 of the elliptical cam 4 is determined based on the measured dimensions, and the machining dimensions of the elliptical cam 4 are determined such that the length of the circumference of the elliptical cam 4 remains unchanged. The determined machining dimensions are used as a target value. The present invention, however, is not limited to such, and the target value of the elliptical shape of the elliptical cam 4 can be determined in any other manner.

What is claimed is:

1. A method for manufacturing a strain wave gear device, the method comprising steps of:
   measuring a dimension of an internal gear;
   measuring a dimension of an external gear, the external gear to be placed inside the internal gear in a radial direction, the external gear being configured to mesh with the internal gear, the external gear being flexible,
   measuring a dimension of a bearing, the bearing to be placed inside the external gear in the radial direction, the bearing being flexible; and
   machining an elliptical cam, the elliptical cam to be placed inside the bearing in the radial direction, the elliptical cam being configured to flex the external gear in a non-circular manner,
   wherein the elliptical cam is made based on the measured dimensions of the internal gear, external gear and bearing such that the internal and external gears mesh with each other at a constant position.

2. The method of claim 1, wherein, in the step of machining the elliptical cam, one of a plurality of ellipse cutting programs is selected and used.

3. The method of claim 1, wherein a between pin diameter of the internal gear is measured.

4. The method of claim 1, wherein an over pin diameter of the external gear is measured.

5. The method of claim 1, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

6. A method for manufacturing a strain wave gear device, the method comprising steps of:
measuring a dimension of an internal gear;
measuring a dimension of an external gear, the external gear to be placed inside the internal gear in a radial direction, the external gear being configured to mesh with the internal gear, the external gear being flexible;
measuring a dimension of a bearing, the bearing to be placed inside the external gear in the radial direction, the bearing being flexible; and
machining an elliptical cam, the elliptical cam to be placed inside the bearing in the radial direction, the elliptical cam being configured to flex the external gear in a non-circular manner,
wherein the elliptical cam is made based on the measured dimensions of the internal gear, external gear and bearing such that the internal and external gears mesh with each other at a constant position,
wherein, in the step of machining the elliptical cam, one of a plurality of ellipse cutting programs is selected and used,
wherein a between pin diameter of the internal gear is measured,
wherein an over pin diameter of the external gear is measured, and
wherein, in the step of machining the elliptical cam, a major axis dimension of the elliptical cam is determined based on the measured dimensions, and a machining dimension of the elliptical cam is determined such that a length of a circumference of the elliptical cam remains unchanged.

7. A strain wave gear device comprising:
an internal gear;
an external gear placed inside the internal gear in a radial direction, the external gear meshing with the internal gear, the external gear being flexible;
a bearing placed inside the external gear in the radial direction, the bearing being flexible; and
an elliptical cam placed inside the bearing in the radial direction, the elliptical cam being configured to flex the external gear in a non-circular manner,
wherein the elliptical cam is made based on measured dimensions of the internal gear, external gear and bearing such that the internal and external gears mesh with each other at a constant position.

8. The strain wave gear device of claim 7,
wherein a between pin diameter of the internal gear is measured,
wherein an over pin diameter of the external gear is measured,
wherein the elliptical cam is made using a selected one of a plurality of ellipse cutting programs according to (i) a major axis dimension of the elliptical cam determined based on the measured dimensions and (ii) a machining dimension of the elliptical cam determined such that a length of a circumference of the elliptical cam remains unchanged.

9. The method of claim 2, wherein a between pin diameter of the internal gear is measured.

10. The method of claim 2, wherein an over pin diameter of the external gear is measured.

11. The method of claim 3, wherein an over pin diameter of the external gear is measured.

12. The method of claim 9, wherein an over pin diameter of the external gear is measured.

13. The method of claim 2, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

14. The method of claim 3, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

15. The method of claim 4, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

16. The method of claim 9, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

17. The method of claim 10, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

18. The method of claim 11, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

19. The method of claim 12, wherein, in the step of machining the elliptical cam, a major axis dimension of the elliptical cam is determined based on the measured dimensions, and a machining dimension of the elliptical cam is determined such that a length of a circumference of the elliptical cam remains unchanged.

* * * * *